March 17, 1959 F. K. BECKER 2,878,310

TWO-WAY TELEVISION OVER TELEPHONE LINES

Filed May 5, 1955 3 Sheets-Sheet 1

INVENTOR
F. K. BECKER
BY
Harry C. Hart
ATTORNEY

March 17, 1959 F. K. BECKER 2,878,310

TWO-WAY TELEVISION OVER TELEPHONE LINES

Filed May 5, 1955 3 Sheets-Sheet 2

INVENTOR
F. K. BECKER
BY Harry C. Hart
ATTORNEY

INVENTOR
F. K. BECKER
BY Harry C. Hart
ATTORNEY 2,878,310

TWO-WAY TELEVISION OVER TELEPHONE LINES

Floyd K. Becker, Summit, N. J., assignor to Bell Telephone Laboratories, Incorporated, New York, N. Y., a corporation of New York Application May 5, 1955, Serial No. 506,235

10 Claims. (Cl. 178—6)

This invention relates to two-way communication service and has for its principal object to provide each subscribing party to such service with simultaneous audible and visual impressions originating with the other party. A related object is to provide such two-way sight and sound communication without making undue frequency bandwidth demands on the transmission medium.

The worldwide development of excellent telephony, i. e., two-way voice communication, which has taken place during the past half century has been rendered possible by the steadfast adherence, on the part of those responsible for the development, to two goals: The determination of the necessary and sufficient frequency band for a telephone channel, and standardization of equipment and techniques in a fashion to provide every subscriber with this standard band. As a consequence of this development, the world, and especially the territory of the United States of America, is covered with a network of telephone lines, each having a bandwidth of approximately 4,000 cycles per second. This necessary and sufficient bandwidth of 4,000 cycles per second represents a judicious compromise between considerations of naturalness of voice reproduction on the one hand which make for greater bandwidth and greater cost, and provision for the continued growth and expansion of the telephone system, which dictate the reduction of bandwidth. The development has also been greatly facilitated by the acceptance of low power levels: sufficient to actuate a transducer which is held to the ear, and no more.

By contrast, the art of image signal transmission has developed along other lines, represented by two divergent tendencies. On the one hand, television has aimed at supplying each receiver with pictures of large size, suitable for simultaneous viewing by a number of persons and in a great amount of detail, represented by wide variations of contrast in the picture, both from point to point at the same time, and from time to time at the same point. These aims can only be attained at the price of very great frequency bandwidth in the transmission medium, so great, indeed that such facilities are out of the question, economically, for a private subscriber, and can be tolerated only by those who simultaneously reach a large number of receivers; i. e., by broadcasters. In other words, television is essentially a one-way communication medium.

The other tendency, typified by the facsimile art, is to force image signals through narrow band transmission channels without sacrifice of the point to point detail. This can be done only at the price of a heavy sacrifice of the time to time detail. Thus the transmission of a picture by facsimile techniques may occupy many minutes. It may even be still in process and not completed when the need for it is past. From the communication standpoint, facsimile is thus comparable with telegraphy; i. e., delivery of the message concurrently with the request for such delivery is impossible.

It is obviously desirable that ordinary two-way voice communication be supplemented by some sort of two-way image signal communication. The slow transmission speed of facsimile and the wide frequency band of television place these techniques beyond consideration.

A copending application of W. E. Kock and R. L. Miller, Serial No. 459,300, filed September 30, 1954 deals with this problem and offers a solution to it. Like the invention of that application, the present invention takes as its starting point the view that the value to the subscribers of any such image signal supplement to their voice communication is roughly equal to the value of the voice communication itself. It takes bandwidth as the best single measure of the price at which such value is purchased and accordingly allots a single entire 4,000 cycle per second bandwidth telephone channel to such image signal. Having established this bandwidth restriction it then sets out to furnish each subscriber, concurrently with the voice of his opposite party, with a picture of his opposite party too, and to establish, within the restrictions imposed by this bandwidth limitation, an optimum compromise between the various considerations which require bandwidth for their transmission, namely picture size, picture contrast variations, and rapidity of picture change.

A picture having the form of a rectangular whose dimensions are 1⅛ inch by ⅞ inch contains about 2,500 picture elements which are at the threshold of resolution of the unaided eye at the distance of most distinct vision. These picture elements may be regarded as arranged in a number (specifically 63) of parallel horizontal lines that are vertically adjacent, each containing a different number (specifically 40) of picture elements, or a total of $63 \times 40 = 2520$ picture elements, in all. It has been found that such a picture contains an amount of detail which is necessary and sufficient as a voice telephone supplement. It has also been found that the transmission of a fresh picture of this character once each second, which requires, in principle, a band of nominal width 1,250 cycles per second, creates in the viewer a highly satisfactory impression of the viewed party and his movements.

The satisfying character of this impression is in large measure due to the fact that the time through which each picture endures, before giving place to the next one, is longer than the visual retention time of the eye, so that the impression of flicker is avoided, and shorter than the neural retentivity of the brain so that an impression of continuity from each picture to the next is achieved. The selection of this period determines the picture change rate. This rate, together with the available channel bandwidth, determines the number of distinct "elements" which make up the picture; and the holding of these elements at or below the threshold of resolution of the eye determines the size of the picture.

Accordingly the invention provides transmission, from each subscribing party to the other, and over a standard 4,000 cycles per second telephone channel, of pictures of this character, and at this rate.

To actualize such two-way sight and sound communication, the system of the above mentioned Kock-Miller application provides each telephone subscriber, in addition to his telephone set which may be conventional, with a scene pickup device, e. g., a miniature camera tube, and an image forming device, e. g., a miniature picture reproducing tube. These devices are preferably mounted close together and on axes which converge at an intersection point somewhat beyond the distance (10 inches, approximately, for the unaided eye) of most distinct vision, measured from their faces; i. e., at a distance of 20–40 inches. The camera tube generates image signals of whatever scene is within its field of view, in the customary way, and at a rate of, for example, 20 frames per second. A single one of these frames, for example the twentieth, is stored as on a record, the remaining nineteen being discarded. This record is scanned at slow speed, to produce modified image signals, compressed on the frequency scale and expanded on the time scale by a factor of 20:1. The modified signals are transmitted over a standard telephone channel, whose bandwidth is sufficient for the purpose, to a receiver station, where they are recorded at the relatively slow rate at which they arrive. The resulting record is now scanned twenty times in succession and at a high speed: higher, in the ratio of 20:1 than the recording speed, to recover an image signal representing the one undiscarded frame, and restored to its original dimensions in frequency and time. This image signal is applied twenty successive times to the receiving subscriber's reproducer tube to produce on its face twenty successive repetitions of the undiscarded frame. At the end of one second, these operations are repeated for the fortieth frame, the intervening ones being discarded as before, and so on. The receiving subscriber is thus presented with a sequence of physically still pictures, each of which endures for one second and then gives place abruptly to the next. The impression made on the receiving subscriber is one of flickerless, undelayed picture transmission which is concurrent with, and supplements, his voice transmission, while the picture rate of change is such as to create the illusion of almost continuous change in the scene being viewed.

In accordance with the present invention the system is instrumented in a novel fashion. The vision signal of the selected frame is recorded, as in the preceding system, the remaining frames of the cycle being discarded. But now, instead of scanning the record thus made at reduced speed, the record is intermittently sampled at the original speed. That is to say, the samples are picked off the record in a somewhat elaborate order, with no change in the speed of the record. Each such sample is held steady or stretched throughout a time interval in which a number of picture elements of the record pass any fixed point, and the resulting sequence of stretched samples constitutes a derived time signal of narrow frequency band suitable for transmission by way of a telephone channel to a receiver station. Because of the order of pick off of the samples, this derived time signal is not an image signal, and if applied to an image signal reproducer with or without speed change, the resulting image would bear no relation to the original scene. However, this time signal contains all the necessary image detail for such reconstitution, and when it has been correctly reordered, becomes an image signal once more. Hence the invention also provides means, at the receiver station, for reordering the elements of the derived time signal. This reordering is accomplished by sampling the incoming signal at appropriate instants and laying down the resulting signal elements as record elements on an appropriate medium in the time order in which they are received, but not, by any means, contiguously on the medium. As the medium advances past the recording head in the course of a number of revolutions, it is gradually filled with such samples. When the cycle is complete, it turns out that samples which are contiguous on the receiver record were also contiguous on the transmitter record, and hence that the receiver record is in fact a vision signal in space pattern form. This is now picked off the receiver record in conventional fashion to provide a conventional time series image signal, and the latter is repeatedly applied to an image reproducer, once for each revolution of the record, to reconstruct, at the receiver station, the one-frame scene selected at the transmitter station.

In an ordinary telephone conversation, each party may at any time if he wishes, hear without being heard, as when he wishes to speak to a visitor, merely covering his telephone transmitter with his hand to prevent his voice waves from striking its diaphragm. The present system provides visual counterpart to this operation, enabling one subscriber to see a picture of the other without himself being seen. This is accomplished by the relative disposition of the pickup device and the reproducer device and by the provision and arrangement of an adjustable eye guide with respect to them in a fashion such that the subscriber may either view the received picture as it appears on the face of the reproducer tube through the guide, in which event his face is within the field of the camera tube, or he may view it around the guide, in which event his face is concealed from the camera tube. Each subscriber may adjust his own eyeguide to suit his own preferences.

The invention will be fully apprehended from the following detailed description of a preferred illustrative embodiment thereof taken in connection with the appended drawings in which.

Figure 1:
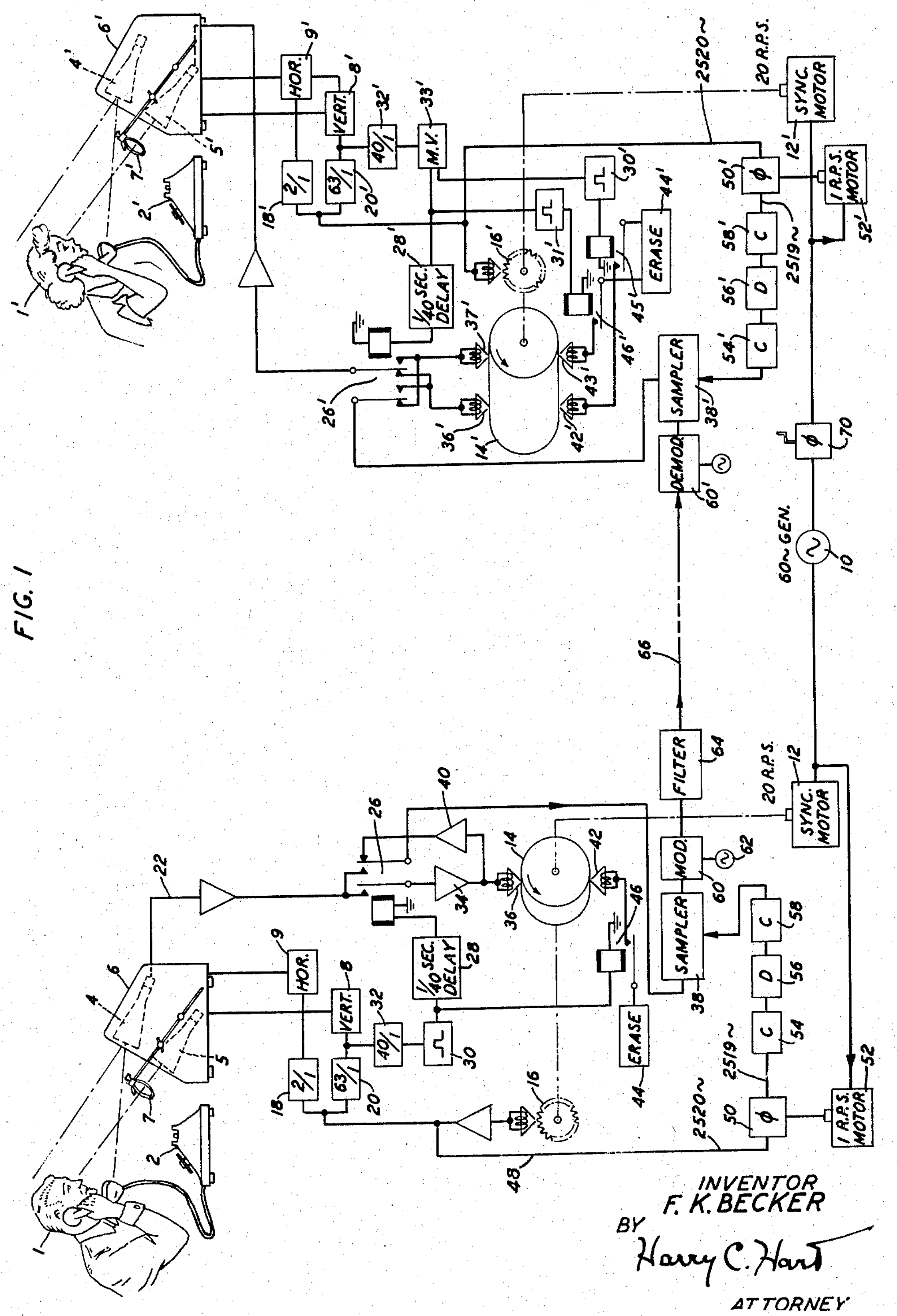
Fig. 1 shows a sound and sight transmission system in accordance with the invention.

Referring now to the drawings, Fig. 1 shows, in block schematic form, a complete system embodying the invention. Here, a West subscriber 1 and an East subscriber 1' are shown engaged in a two-way sight and sound communication. While in practice each of them is to be provided with transmitting apparatus and receiving apparatus, the drawing shows the West subscriber's transmitting apparatus and the East subscriber's receiving apparatus. Duplication of the receiver apparatus in the West station and of the transmitter apparatus at the East station presents no problem, but to show such duplication would tend unduly to complicate the drawing.

Each subscriber is provided with a conventional telephone set 2, 2', including a transmitter and a receiver. Associated telephone apparatus and lines, which may be conventional, are not shown. In the description to follow, receiver apparatus elements shown at the East station, that are the same as the West station sending apparatus elements, are denoted by like reference characters, distinguished by primes.

Each subscriber is provided, further, with a supplementary image signal set which may comprise a miniature camera tube 4 and a miniature reproducer tube 5, together with associated apparatus for controlling the intensity and the vertical and horizontal sweeps of the cathode beams of these tubes. The tubes, 4, 5 may be mounted in a cabinet 6 having a front face arranged at an angle for the convenience of the subscriber 1, and they are preferably mounted therein with their faces not more than a few inches apart and at an angle to each other such that their central axes intersect at the distance of greatest subscriber convenience, which is normally about twenty to forty inches distant from the faces of the tubes. An adjustable eyeguide 7 is preferably provided, extending from the face of the cabinet 4, in front of the reproducer tube 5.

A wave to control the vertical sweeps of the cathode beams is applied to the beam sweeping apparatus within the cabinet from a vertical sweep generator 8, and similarly a wave to control the horizontal sweeps of the cathode beam is derived from a horizontal sweep generator 9 and similarly applied.

These sweep generators, 8, 9, as well as other apparatus components, are controlled as to frequency and phase by a basic timing source such as the output of a sixty-cycle generator 10 with which telephone subscribers are normally provided by their public utility companies. This generator 10 drives a synchronous motor 12 which is coupled by way of a shaft indicated by a broken line to a magnetic recording drum 14 and to an induction generator 16. These elements are coupled directly together and are arranged by the selection of the speed of the synchronous motor 12 and such gear trains as may be desired, to rotate at a preassigned speed such as twenty revolutions per second. The induction generator 16 is provided with 126 teeth. Hence, it delivers to its output coil a wave having 126 cycles per revolution and thus 2,520 cycles per second.

This wave output is applied in parallel to two frequency dividers 18, 20, the first of which divides the frequency of the wave, 2520 cycles per second, by two, while the second divides it by sixty-three. The output of the first frequency divider 18 trips the horizontal sweep generator 9 to sweep the beams of the camera tube 4 and the reproducer tube 5 horizontally 1260 times per second, while the output of the second frequency divider 20 trips the vertical sweep generator 8 to sweep the beams vertically 40 times per second. In accordance with the well-known principles and techniques of television these operations give rise on an output conductor 22 of the camera tube to conventional image signals, 40 interlaced fields, or 20 frames per second. Each of these frames is built up of 63 lines, and hence each field is built up of 31½ lines, while with the small picture mentioned above each line contains about 40 distinguishable picture elements.

In accordance with the present invention these image signals are applied to the front contacts of a relay 26 which is momentarily actuated once during each second for a period of $1/20$ second, and is shown in its unactuated condition. This actuation may be secured in any desired fashion but for the sake of best illustrating the principles of the invention the drawing shows the coil of the relay 26 as being energized, through a delay device 28 whose function will be described below, by the output of a pulse generator 30 which is triggered by the output of a 40:1 frequency divider 32 to which is applied the output of the 63:1 frequency divider 20 which, as above stated, is driven by the 2520 cycles per second output of the generator 16. The pulse generator 30 is adjusted in well-known fashion to provide output pulses of $1/20$ second duration. Inasmuch as $63 \times 40$ equals 2520, the relay 26 is operated once each second for $1/20$ second each time. Such operation urges both moving contacts against the fixed front relay contacts and holds them there for precisely $1/20$ second, thereupon allowing them to return under the influence of their restoring springs to engage the back contacts of the relay 26 as shown.

As above stated, the synchronous motor 12 drives the magnetically sensitive drum 14 or other record sensitive element at a steady speed of 20 revolutions per second. Thus the drum 14 makes one full revolution during $1/20$ second. When the front contacts of the relay 26 are closed as above described for $1/20$ second, the output of the camera tube 4 is applied by way of one of these contacts and a recording amplifier 34 to a magnetic record-reproduce head 36 which may be of any well-known construction. Thus that part of the output of the camera tube 4 which appears during this interval is recorded on the drum 14 in the form of a track extending circularly through one revolution. At the same time, closure of the other front contact of the relay 26 applies the output of the camera tube 4 to a sampler 38 whose operation will be described below. During the remaining $19/20$ of a second the moving contacts of the relay 26 rest against the fixed back contacts. Hence, the paths from the camera tube 4 to the recording head 36 and to the sampler 38 are both open. However, the head 36 is now connected by way of a reproducer amplifier 40 and the second back contact of the relay 26 to the sampler 38. The head 36 now operates as a pickup device, and during these $19/20$ of a second the signal recorded in the first twentieth of the second is picked off the drum 14 and applied to the sampler 38. As a result the sampler 38 receives image signals continuously, first directly from the camera tube 4 and thereafter during the remainder of each second from the drum 14.

The space pattern signal of each selected frame of the field of view of the camera tube at the West station must, of course, be erased after the sampling process has been completed in order to place the drum in readiness to receive a similar space pattern record of the next selected frame. This erasure may be accomplished by a second recorder head 42 located diametrically opposite to the first head 36 and energized from an erasing voltage source 44 through the contacts of a relay 46. These contacts are closed for $1/20$ second, i. e., throughout a full revolution of the drum 14, once in each second. To this end the relay 46 is actuated by the output of the pulse generator 30 which, as described above, delivers pulses of the necessary duration and at the required rate. In order that the erasure may take place after completion of the sampling of the record for one frame and before the commencement of the recording operation for the next frame, a delay 28 of $1/40$ second, corresponding to the time for ½ revolution of the drum 14 is interposed between the pulse generator 30 and the relay 26.

It will be seen below that it is advantageous to allow the phase of the drum rotation to creep slowly, during the sampling process, with respect to the phase of the sampling pulses. This is achieved in accordance with the invention in the following fashion. As explained above, the frequency of the output of the induction generator 16 is 2,520 cycles per second. It is applied by way of a conductor 48 and through a rotary phase shifter 50 to the sampler 38. The rotary phase shifter may be of the type described in Meacham Patent 2,004,613. The rotary member of this phase shifter 50 is rotated at a speed of one revolution per second by a supplementary synchronous motor 52 driven from the basic timing source 10. Thus the frequency of the output of the rotary phase shifter 50 is either 2,519 cycles per second or 2,521 cycles per second in dependence on the direction of this rotation. Which of these two conditions is chosen affects only the direction of the aforesaid creep.

Figure 2:
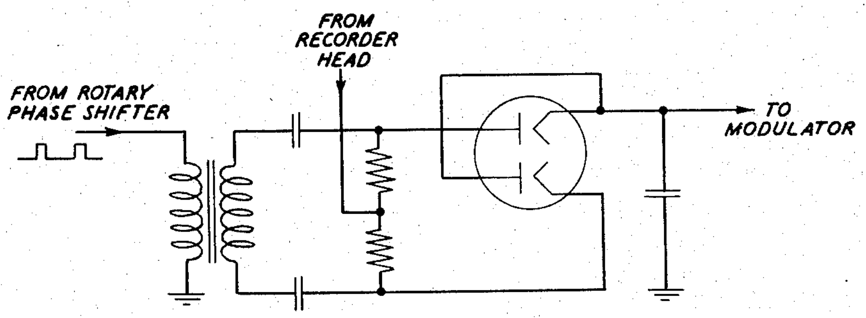
Figs. 2 and 3 are schematic circuit diagrams showing the details of sampling circuits of Fig. 1.

The output of the rotary phase shifter 50, taken by way of example as having a frequency of 2,519 cycles per second, is converted into a sequence of sharp pulses in well-known fashion through a first clipper 54, a differentiator 56 and a second clipper 58 connected in tandem in the order named, and is applied to one input point of the sampler 38. While many alternative forms are available, a suitable circuit arrangement for the sampler is as shown in Fig. 2. With this arrangement the image signals applied to the first input point of the sampler 38, whether from the camera tube 4 or from the magnetic drum 14, are briefly sampled 2,519 times per second by the pulses derived from the rotary phase shifter 50 and applied to the second input point of the sampler 38. The condenser in the output circuit of the sampler (Fig. 2) operates to hold each sample from the instant at which it is derived until the next sampling instant, i. e., while twenty signal elements on the drum 14 pass by the record-reproduce head 36. The resulting train of samples is of a bandwith which is reduced by a factor of 20:1 as compared with the bandwidth of the original image signal. It is not, however, merely a slowed-down version of the image signal as it appears on the conductor 22, for the reason that the brief samples have been derived by the sampler 38 out of their natural order.

This sample train is now advantageously translated to the approximate center of a standard telephone transmission channel by a modulator 60 to which is applied a carrier signal of 2,400 cycles per second derived from a source 62. The resulting signal-modulated carrier may if desired be passed through a band-pass filter 64, e. g., a vestigial side band filter, for transmission to the receiver station over a standard telephone line 66 of 4,000 cycles per second bandwidth.

Figure 4:
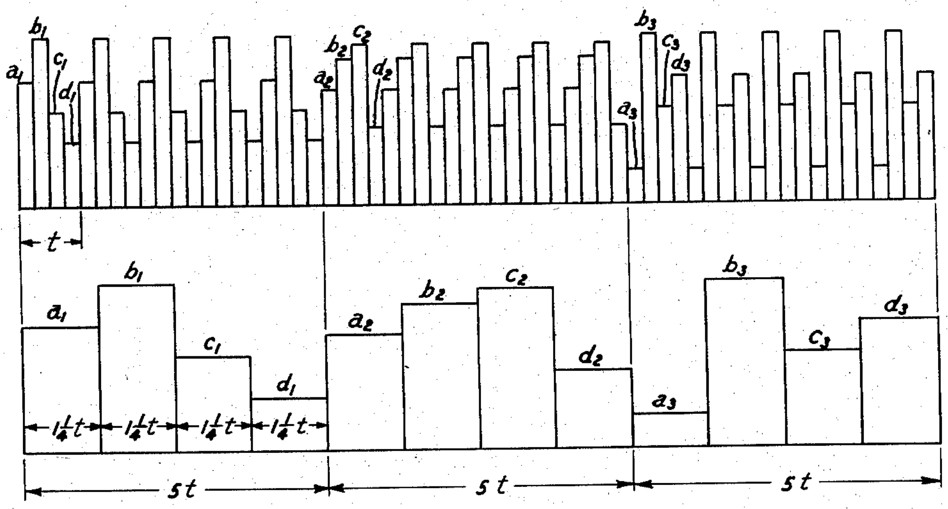
Figs. 4 and 5 are waveform diagrams of assistance in explaining the operation of the apparatus of Fig. 1.

The function and effect of the sampling process as carried out in accordance with the invention will be understood from consideration of certain simplified examples as follows:

In the upper portion of Fig. 4 there is shown a simplified image signal comprising a group of elements $a_1$, $b_1$, $c_1$ and $d_1$, each group being repeated five times. These elements may be regarded as having been recorded on a magnetic drum and as occupying the full circumference of such drum which makes a full revolution in a time $t$. The five repetitions of this group of signal elements are thus derived from five successive revolutions of the drum.

Assume, now, that the recorded space pattern is sampled when the first signal element occurs, and this sample is held for a period $5t$; namely, throughout a full revolution of the drum, past the first recurrence of the first signal element and until the second signal element has occurred for the second time. Assume, further, that the recorded space pattern is now sampled again and that this second sample be held for a like time, and so on. The magnitude and duration of each of the resulting samples, which are four in number, is shown in the lower part of the figure from which it also appears that the time occupied for taking and holding four such samples is the same as the time which elapses during five drum revolutions. The central portion of the figure shows a different group of signal elements $a_2$, $b_2$, and $d_2$, each repeated five times. Similarly, the right-hand portion of the figure shows a third group of signal elements $a_3$, $b_3$, $c_3$ and $d_3$, each repeated five times. As before, each group may be regarded as being recorded on the circumference of the drum which rotates through five revolutions while four samples are taken.

In this simplified case it is evident that the creep of the phase of the drum with respect to that of the train of sampling pulse is ¼ revolution for each sample, or a total of a full revolution for all four samples.

Evidently the train of samples shown in the lower part of Fig. 4 is a replica of the signal elements recorded on the drum except for a change of the time scale. They have been slowed down in time by a factor of five and so occupy ⅕ of the frequency bandwidth occupied by the original image signal. They are arranged in the same time order as the image signal elements, and, if returned to their original time scale, could be reconstituted as an image signal without the necessity of any reordering.

Figure 5:
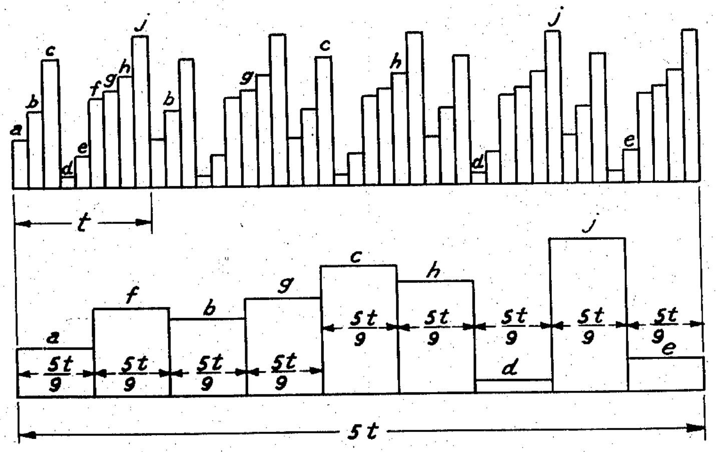

Fig. 5 shows a somewhat more complicated situation in which the signal is constituted of nine distinguishable elements identified as *a, b, c, d, e, f, g, h,* and *j*, respectively, repeated five times. These signal elements may be regarded as being recorded on the circumference of a drum whose revolution period is $t$. Assume, now that brief samples are taken of the record at intervals $$\frac{5t}{9}$$

taken in the following order:

*a*
*f*
*b*
*g*
*c*
*h*
*d*
*j*
*e* thus nine samples have been taken in a period $5t$ or while the drum makes five revolutions. A similar process applied to another group of nine signal elements would derive samples of them during the sixth through the tenth revolutions of the drum.

Evidently the train of samples shown in the lower part of Fig. 5 contains a sample of each of the nine signal elements shown in the upper part of the figure and therefore contains the same information content. It differs, however, from the image signal derived from the camera tube because the order in which the samples are taken is not the same as that in which the signal elements appear. Thus if the first sample taken and held be of magnitude $a$ the next is of magnitude $f$, the third is of magnitude $b$, the fourth of magnitude $g$ and so on, so that samples of the recorded space pattern signal are in fact taken out of the order in which they appear on the record. But because of each sample is held while four picture elements pass by, there results a slow-down factor of five so that the derived sample sequence requires for transmission a channel having a frequency band of only ⅕ of that which would be required for transmission of the original image signal.

The sampling process of the invention permits freedom in the choice of the frequency demultiplication factor. In a simple case this is exemplified by Fig. 5 wherein the frequency demultiplication factor is five whereas, had the signal elements been sampled in the same order as in Fig. 4, i. e., allowing the drum to rotate through a full revolution between samples, the demultiplication factor would have been ten.

In a somewhat more complicated situation, consider a train of sixteen distinguishable signal elements on a drum. These may be sampled in order, allowing the drum to rotate through a full revolution between samples, in which case the frequency demultiplication factor is 17. The drum might also be permitted to rotate through two or more revolutions between samples in which case the frequency demultiplication factor would be 33, 49, et cetera. On the other hand, assume that ¼ revolution is permitted to elapse between each sample and the next. If the first sample taken is that of signal element No. 1 the next is signal element No. 6, the next No. 11, the next No. 16, the next No. 5, and so on. The sixteen samples are thus taken in the following order:

| Sample No. | Signal Element No. |
|---|---|
| 1 | 1 |
| 2 | 6 |
| 3 | 11 |
| 4 | 16 |
| 5 | 5 |
| 6 | 10 |
| 7 | 15 |
| 8 | 4 |
| 9 | 9 |
| 10 | 14 |
| 11 | 3 |
| 12 | 8 |
| 13 | 13 |
| 14 | 2 |
| 15 | 7 |
| 16 | 12 |

This schedule shows that three samples are taken while the drum rotates through 15/16 revolution, or 3⅕ samples per revolution.

Hence the frequency demultiplication factor is evidently $$\frac{16}{3.2}=5$$

whereas, had the samples been taken in order with a full revolution of the drum between successive samples, it would have been 17. The train of such signal samples is stretched in time and compressed in the frequency domain by a factor 5 and is related to an image signal in the fashion of the sample train of Fig. 5 but is not itself an image signal in the fashion in which the sample train of Fig. 4 is an image signal.

With the foregoing introduction it will be readily understood that an image signal space pattern recorded on the drum 14, while it is in fact continuous, may conveniently be regarded as being composed of 2,520 distinguishable signal elements; that it may be sampled 126 times in each revolution and throughout twenty revolutions while the angular phase of the drum creeps gradually with respect to the phase of the sampling signal. This creep takes place by virtue of the fact that the drum, bearing 2,520 distinguishable signal elements and rotating at twenty revolutions per second, is sampled not 2,520 times but either 2,519 times or 2,521 times.

That the modified image signal occupies no more bandwidth than that of a standard telephone channel will be plain upon recognition that a picture comprising 63 lines, each having 40 picture elements, or a total of 2,520 picture elements, compares favorably, in respect to its quality and detail, with a half-tone reproduction in a magazine or a newspaper, provided only that it be restricted in size. Thus if 2,520 picture elements are distributed over a rectangular picture whose dimensions are 1⅛ inch by ⅞ inch, the picture elements are not individually visible to the unaided eye. By spreading the transmission of these picture elements of a single frame over the entire period of a single second of time the desired transmission can in principle be carried out within a band of 1,260 cycles per second. Thus the provision of a conventional standard telephone channel of 4,000 cycles per second bandwidth, whose phase and amplitude characteristics are suitable at least over the central 2,000 cycle part of its band, is ample for a picture of approximately one inch square; indeed, it provides a margin of safety.

Coming now to the details of the apparatus which carries out these operations, the East subscriber 1' is provided with a conventional telephone instrument 2', a cabinet 6' containing a camera tube 4' and a reproducer tube 5' and supplied with vertical and horizontal synchronizing pulses from generators 8', 9'. The East station is provided with a magnetically sensitive drum 14' which is directly coupled to an induction generator 16' having 126 teeth, the two being driven together at twenty revolutions per second by a synchronous motor 12' controlled by the basic timing source 10. Horizontal and vertical pulses to control the sweep generators 8', 9' are derived, as in the case of the West station, through a 2:1 frequency divider 18' and a 63:1 frequency divider 20' from the output of the induction generator 16' whose frequency is 2,520 cycles per second. The receiver drum 14' is provided with two magnetic heads 36', 37' disposed at different locations along the length of the drum 14'. These operate alternately as recorder and pickup, under control of a relay 26' which is actuated by a multivibrator 33' which receives impulses from a 40:1 frequency divider 32' driven by the output of the 63:1 frequency divider 20'. The relay 26' may be arranged in well-known fashion to hold its contacts in one position for one second, then in the opposite position for the next second and so on, with a period for the full completion of its operations of two seconds.

Figure 3:
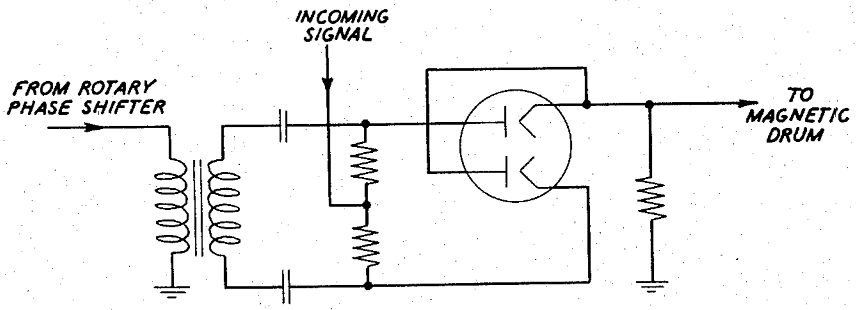

The disordered image signal arriving by way of the transmission line 66 is first reduced to its original range on the frequency scale by a demodulator 60' and is then applied to the first input point of a sampler 38'. The sampling is carried out at exactly the same rate as the sampling of the space pattern signal on the West station drum 14' namely, in the example taken, at 2,519 samples per second. The sampling pulses may be derived, exactly as in the case of the West station, from the output of the induction generator 16' through a rotary phase shifter 50'. The rotor of the phase shifter 50' being driven at one revolution per second by an auxiliary motor 52' controlled by the basic timing generator 10, the frequency of the signal derived from the phase shifter 50' is 2,519 cycles per second. As in the case of the West station this control signal is converted into a sequence of sharp pulses by a first clipper 54', a differentiator 56' and a second clipper 58' connected in tandem, and the resulting train of pulses is applied to the second input point of the sampler 38' which operates to sample the incoming train. Unlike the sampler in the West station, it does not hold each sample until the arrival of the next but delivers its output in the form of the briefest possible pulses by way of the contacts of the relay 26' to one recorder head 36' or to the other, 37' as the case may be. A suitable circuit is shown in Fig. 3. These samples are thus placed on the drum 14' in the time order in which they are received. Because, however, a substantial fraction of a drum revolution takes place between the recording of each sample and the recording of the next sample the result, after all of the samples of a full cycle have been rearranged in the same space order as that in which they originally appeared on the West station drum, is that they constitute a space pattern image signal spread over one full revolution of the drum 14'.

Upon the conclusion of each full cycle of the recording process which requires one second of time, the relay 26' is operated and the ensuing cycle of incoming disordered signal samples is similarly recorded on another portion of the surface of the drum by the second record-reproduce head 37' and so reordered as a space pattern image signal. While this takes place the space pattern image signal representing the prior cycle of operation, and thus the prior frame of the West station scene, is picked up by the first record-reproduce head 36' and applied by way of the contacts of the relay 26' and a conductor 22' to the reproducer tube 5'. The first application consumes 1/20 second, and is followed immediately by a second application due to a second passage of the drum 14' past the pick-up head. This application is in fact repeated twenty times in succession so that the reproducer image as it appears on the screen of the East station reproducer tube 5' appears stationary.

The same operations take place for each of the successive frames of the scene 1 viewed by the camera tube 4 at the West station. In order that this may be possible the space pattern record of the incoming signal samples which is placed on the drum 14' during one second of the operation of the relay 26', and thereupon repeatedly picked off the drum and repeatedly applied to the television reproducer tube 5' during the next second, must be erased in order to leave the sensitive track on the drum 14' clean and ready to receive a record of a new sample train. To this end, two eraser heads 42', 43' are provided, each disposed diametrically opposite to one of the record-reproduce heads 36', 37'. These are operated in alternation from a source 44'' of erasing voltage through relays 45', 46' which are energized by the pulse generators 30', 31', which deliver 1/20 second pulses under control of the separate outputs of the multivibrator 33'. The contacts of each relay are closed for 1/20 second, open during the remaining 19/20 of that second and throughout the following second. During the following second these conditions are reversed. In order that the erasure may take place after completion of the reproduction of the record of one frame and before the commencement of the recording operation of the incoming signal sample train representing the next selected frame, a delay 28' of 1/40 second, corresponding to the time of ½ revolution of the drum 14', is interposed between the multivibrator 33' and the record-reproduce relay 26'.

To bring the entire set of East end operations into phase with the entire set of West end operations, provision is made for adjusting the phase of the angle of the output shaft of the synchronous motor 12' into proper relation with the corresponding angular position of the output shaft of the West station synchronous motor 12. This phasing may be carried out in any desired fashion, an adjustable phase shifter 70 being schematically shown for the purpose.

Each subscriber 1, 1' is provided with an eyeguide 7, 7' comprising a loop of adjustable diameter mounted in front of the face of the reproducer tube 5, 5' and at an adjustable distance therefrom. It may be arranged, by each subscriber in terms of his own preferences, in a fashion such that it marks a boundary of the field of view of the camera tube 4, 4' in terms of the angle from which the reproducer tube 5, 5' is viewed by the subscriber. That is to say, it is mounted in a location such that the subscriber 1, 1' may conveniently view the reproducer tube 5, 5' through the loop of his eyeguide 7, 7' in which case his head is centered in the field of view of the camera tube 4, 4'. He may, however, if he prefers to see his opposite party without being seen, merely move to one side and view the reproducer tube 5, 5' aslant, in which case he has removed his head from the field of view of the camera tube.

What is claimed is:

1. An image transmission system which comprises a pair of stations, the first station being provided with an image signal generator and the second station being provided with an image reproducer, means including said generator for forming an image of a scene to be transmitted, said image comprising a sequence of $n$ frames per time unit, means for selecting one of said $n$ frames and for rejecting all others of said $n$ frames, a revolving member having a sensitive surface, means for storing said selected frame as a first space pattern on said surface, means for deriving a sequence of brief samples of said pattern, means for converting said sample sequence into a wave train, transmission means for conveying said wave train to said second station, and, at said second station, means for deriving a second sequence of samples of an incoming wave train, means for storing said second sample sequence as a second space pattern, and means including said reproducer for converting said second space pattern into an image of said scene.

2. Apparatus as defined in claim 1 wherein the signal elements stored on said member of which any two successive samples are taken in a single revolution of said member are separated by other signal elements of which samples are similarly taken in later revolutions of said member.

3. In combination with apparatus as defined in claim 1, means for sampling the output of the image signal generator during the selected frame and simultaneously with the storing of said selected frame on said revolving member.

4. In combination with apparatus as defined in claim 1, means for revolving said sensitive member, a record-reproduce head juxtaposed with said member, switching means for alternately ($a$) applying the output of the image signal generator to said record-reproduce head and to said sample-deriving means simultaneously and in parallel, and ($b$) deriving stored signals from said member by way of said record-reproduce head and applying them to said sampling means.

5. In combination with apparatus as defined in claim 4 erasing means disposed diametrically opposite to said record-reproduce head, switching means for enabling said erasing means throughout a single revolution of said member, and means for delaying the action of said first-named switching means for ½ revolution of said member.

6. An image transmission system which comprises a pair of stations, the first station being provided with an image signal generator and the second station being provided with an image reproducer, means including said generator for forming an image of a scene to be transmitted, said image comprising a sequence of $n$ frames per time unit, means for selecting one of said $n$ frames and for rejecting all others of said $n$ frames, a receptive medium, means for storing said selected frame as a first space pattern on said medium, means for deriving a sequence of brief samples of said pattern, means for converting said sample sequence into a wave train, transmission means for conveying said wave train to said second station, and, at said second station, means for deriving a second sequence of samples of an incoming wave train, means for storing said second sample sequence as a second space pattern, and means including said reproducer for converting said second space pattern into an image of said scene, said second sample storing means comprising a revolvable drum bearing thereon a first and a second magnetically sensitive track, means for revolving said drum, a first and a second record-reproduce head juxtaposed with said tracks, respectively, switching means for connecting said first head to said second sample sequence deriving means and for connecting said second head to said image reproducer throughout $n$ of said frames and for interchanging the connections of said heads throughout the ensuing $n$ of said frames.

7. In combination with apparatus as defined in claim 6, means for erasing from each of said tracks the record stored thereon after the completion of $n$ repeated applications of the image signal derived from said track to said image reproducer and prior to the recording on said track of the next selected frame.

8. In combination with apparatus as defined in claim 6, a first and a second erasing means disposed diametrically opposite to said record-reproduce heads, respectively, second switching means for enabling said first erasing means throughout a single revolution of said member immediately prior to the recording of a new signal sample sequence on said first track and for enabling said second erasing means throughout another single revolution of said member immediately prior to the recording of a new signal sample sequence on said second track, and means for delaying the action of said first-named switching means with respect to the action of said last-named switching means for ½ revolution of said member.

9. Apparatus for reconstituting an image of a transmitted scene from an incoming train of pulses, adjacent pulses being derived from discontiguous elements of said scene, which comprises means for deriving a brief sample of each incoming pulse of said train, a revolving receptive member, means for storing said brief samples as discontiguous elements on said member throughout a number of revolutions thereof to build up a space pattern representative of said image, an image reproducer, means for scanning said member continuously to derive an image signal, and means including said reproducer for converting said image signal into an image.

10. An image transmission system which comprises a pair of stations, the first station being provided with an image signal generator and the second station being provided with an image reproducer, means including said generator for forming an image of a scene to be transmitted, said image comprising a sequence of $n$ frames per time unit, means for selecting one of said $n$ frames and for rejecting all others of said $n$ frames, a receptive medium, means for storing said selected frame as a first space pattern on said medium, means operative throughout substantially said entire time unit for deriving a sequence of brief samples of said pattern, means for converting said sample sequence into a relatively slow speed wave train, narrow band transmission means for conveying said wave train to said second station, means for erasing from said receptive medium the record of said selected frame after a sample of each signal element recorded thereon has been derived and prior to the recording on said medium of the next selected frame, and, at said second station, means operative throughout substantially a like entire time unit for deriving a second sequence of samples of an incoming wave train, means for storing said second sample sequence as a second space pattern, and means including said reproducer for converting said second space pattern into an image of said scene.

References Cited in the file of this patent

UNITED STATES PATENTS

| | | |
|---|---|---|
| 2,017,883 | Zworykin | Oct. 22, 1935 |
| 2,202,605 | Schroter | May 28, 1940 |
| 2,314,471 | Wright | Mar. 23, 1943 |
| 2,321,611 | Moynihan | June 15, 1943 |
| 2,629,010 | Graham | Feb. 17, 1953 |
| 2,629,011 | Graham | Feb. 17, 1953 |
| 2,786,887 | De France | Mar. 26, 1957 |